US006789441B2

(12) United States Patent
Blanchard

(10) Patent No.: US 6,789,441 B2
(45) Date of Patent: Sep. 14, 2004

(54) TRANSMISSION BETWEEN A MOTOR MEMBER AND A DRIVE SHAFT AND ENGINE MOTOR PROVIDED WITH SUCH A TRANSMISSION

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 0 days.

(21) Appl. No.: 10/229,071

(22) Filed: Aug. 28, 2002

(65) Prior Publication Data

US 2003/0045398 A1 Mar. 6, 2003

(30) Foreign Application Priority Data

Aug. 29, 2001 (FR) .............................................. 01 11203

(51) Int. Cl.⁷ ........................... F16H 3/08; A01D 69/08
(52) U.S. Cl. .............................. 74/371; 74/372; 56/11.8
(58) Field of Search .......................... 74/371, 372, 373; 56/11.3, 11.7, 11.8; 192/22

(56) References Cited

U.S. PATENT DOCUMENTS

| 3,147,818 | A | | 9/1964 | Howard et al. |
| 4,117,652 | A | * | 10/1978 | Jones et al. .................. 56/11.8 |
| 4,307,795 | A | * | 12/1981 | Roy ......................... 192/69.82 |
| 4,835,949 | A | * | 6/1989 | Seyerle ........................ 56/10.8 |
| 4,841,794 | A | * | 6/1989 | Hikishima .................... 74/371 |
| 4,858,739 | A | * | 8/1989 | Nemoto ..................... 192/18 R |
| 4,907,401 | A | * | 3/1990 | Nemoto et al. .............. 56/11.3 |
| 5,850,758 | A | * | 12/1998 | McCloud et al. ............. 74/371 |
| 6,196,367 | B1 | | 3/2001 | Hanabusa et al. |

FOREIGN PATENT DOCUMENTS

| FR | 2 660 977 | 10/1991 |
| GB | 1 464 658 | 2/1977 |

* cited by examiner

Primary Examiner—Tisha D Lewis
(74) Attorney, Agent, or Firm—Young & Thompson

(57) ABSTRACT

A transmission between a drive member and a drive shaft (1) of an automotive engine comprising, in a housing (2), a friction clutch constituted by at least one rotatable driving element (3) and at least one driven element coming into bearing contact with variable gripping to obtain a variation of the couple transmitted to the output shaft (1) under the action of a control device that at least partially projects from the housing (2). The control device is automatically actuated by two separate inertial forces, one, generated by the driver of the engine, tending to bring together the drive element (3) and the driven element when the resistance to forward movement of the engine increases, the other, generated by the mass of the engine tending to uncouple the drive element (3) and driven element when the resistance to advance of the engine decreases.

9 Claims, 6 Drawing Sheets

US 6,789,441 B2

TRANSMISSION BETWEEN A MOTOR MEMBER AND A DRIVE SHAFT AND ENGINE MOTOR PROVIDED WITH SUCH A TRANSMISSION

FIELD OF THE INVENTION

The present invention relates to a transmission between a motor member and a drive shaft of an automotive tractor engine with an accompanying driver walking behind the engine, this driver acting on the steering member of the engine, such as a handlebar, as well as a driving engine provided with such a transmission.

It relates more particularly to a transmission of the type comprising, in a housing, a friction clutch constituted by at least one rotating drive element and at least one driven element carried by the drive output shaft and kinematically secured in rotation with this latter, these driving and driven element coming into bearing contact with variable engagement to obtain a variation of the couple transmitted to the output drive shaft, such as a wheel drive shaft, under the action of a control device projecting at least partially from the housing.

BACKGROUND OF THE INVENTION

Transmissions of the mentioned type are well known to those skilled in this art. Generally, the control devices coupled to the friction clutch do not permit using the function of varying the speed of clutching.

OBJECTS OF THE INVENTION

An object of the present invention is to provide a transmission of the mentioned type whose design permits incorporating a control device permitting a variation of speed of the engine whilst permitting the driver to control automatically the speed of the engine by automatically controlling the speed change arising from terrain of varied profile such as rising and falling.

Another object of the present invention is to provide a transmission of simple design at a reasonable cost.

SUMMARY OF THE INVENTION

To this end, the invention has for its object a transmission between a drive member and a drive shaft of an automotive tractor engine with a driver walking behind the engine, this driver acting on a steering member for the engine, such as handlebars, the transmission comprising, in a housing, a friction clutch of the type constituted by at least one rotatable driving element and at least one driven element carried by the output drive shaft and kinematically secured in rotation with this latter, these driving and driven element coming into bearing contact with a variable grip to obtain a variation in the couple transmitted to the output drive shaft, such as a wheel drive shaft, under the action of a control device that at least partially projects from the housing, characterized in that the control device is automatically actuated by two separate inertial forces, one, generated by the driver of the engine, tending to bring together the driving and driven element to increase the couple transmitted when the resistance to forward movement of the engine increases, the other, generated by the mass of the engine relieved by the driver, tending to uncouple the driving and driven element to reduce the couple transmitted when the resistance to advance of the engine decreases.

The invention also has for its object a driven tractor engine with an accompanying driver, the driver walking behind the engine acting on a steering member for the engine such as handlebars, this driving engine incorporating between a motor member and a drive shaft a transmission, the transmission comprising, in a housing, a friction clutch of the type constituted by at least one rotatable driving element and at least one driven element carried by the drive output shaft and kinematically secured in rotation with this latter, these driving and driven element coming into bearing contact with a variable grip to obtain the variation of the couple transmitted to the output drive shaft, such as a wheel drive shaft, under the action of a control device at least partially projecting from the housing, characterized in that the transmission is of the mentioned type.

BRIEF DESCRIPTION OF THE DRAWINGS

The invention will be better understood from a reading of the following description of examples of embodiment, with reference to the accompanying drawings, in which.

DETAILED DESCRIPTION OF THE INVENTION

Figure 1:
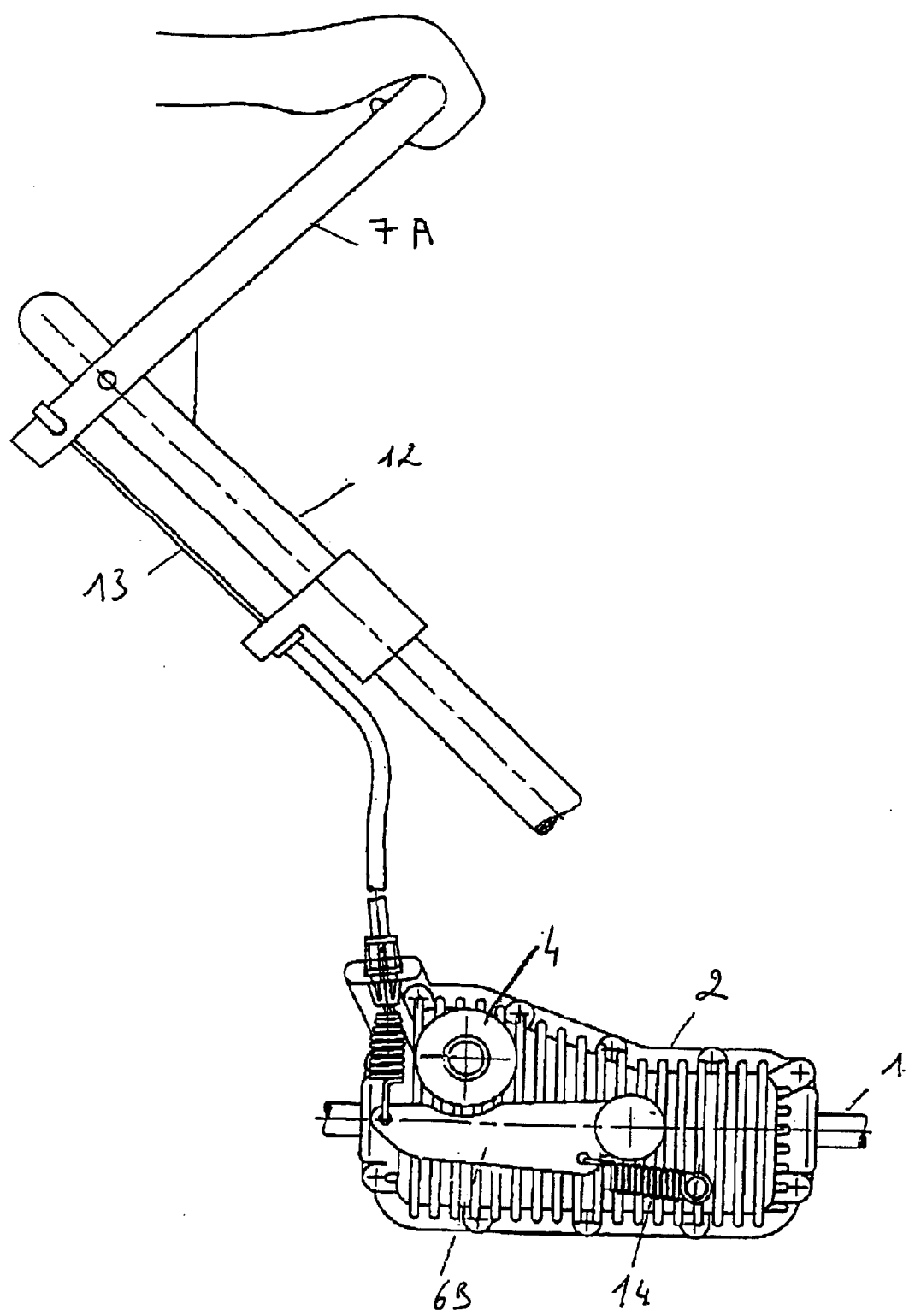
FIG. 1 is a side view of a transmission according to the invention in an engaged position corresponding to a maximum transmitted couple of the engine.

As mentioned above, the transmission, according to the invention, extends between a motor member, such as the drive shaft of the engine, generally the cutting blade carrier of the engine when the engine is for example a lawnmower, and a drive shaft 1 for the engine, such as the drive shaft 1 of the engine, such as the wheel drive shaft.

Such a transmission is adapted to be inserted in a tractor automotive engine with an accompanying driver walking behind the engine. These engines are generally called pushed engines. The driver acts in this case on the steering member 12 for the engine, such as handlebars. This transmission comprises, in a housing 2, generally of synthetic material, a friction clutch of the type constituted by at least one rotatable driving element and at least one driven element 5A, 5B carried by the drive output shaft and kinematically secured in rotation with this latter. In the illustrated examples, the rotatable driving element 3 of the transmission is constituted by a tangent wheel in engagement with an endless drive screw 4, the tangent wheel being adapted to be secured as desired to the output drive shaft 1 by means of at least one driven element 5B having the form of a cone mounted freely slidably and kinematically secured in rotation with the output drive shaft 1, said cone 5B being disposed within the axial bore of the tangent wheel to come, in the course of its controlled movement, into engagement with a conical periphery 3A of the tangent wheel. In the example shown in the figures, the clutch comprises two driven element each having the shape of a cone. The driving element 3 and driven element 5A, 5B come into bearing contact with variable grip so as to obtain a variation of the couple transmitted to the drive output shaft 1 of the wheels under the action of a control device projecting at least partially from the housing 2.

In a manner characteristic of the invention, the control device is automatically actuated by two separate inertial forces, one, generated by the driver of the engine tending to bring the driving element 3 and the driven element 5A, 5B into engagement to increase the couple transmitted when the resistance to advancement of the engine increases, the other, generated by the weight of the engine that is relieved by the driver, tending to uncouple the driving element 3 and driven element 5A, 5B to reduce the couple transmitted when the resistance to advance of the engine decreases.

Figure 2:
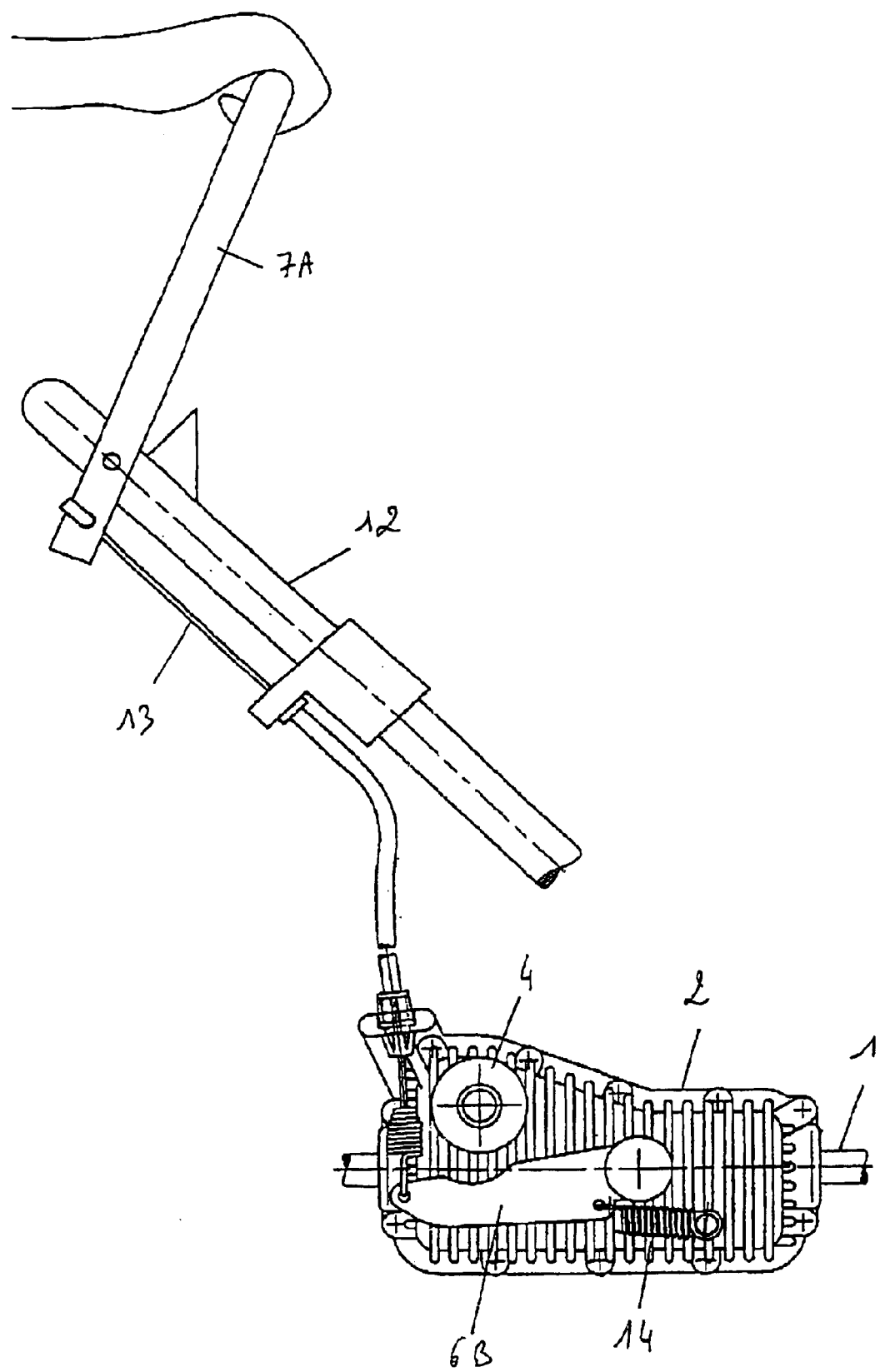
FIG. 2 shows a view similar to FIG. 1 in an engaged position with an intermediate couple transmitted from the engine.
Figure 3:
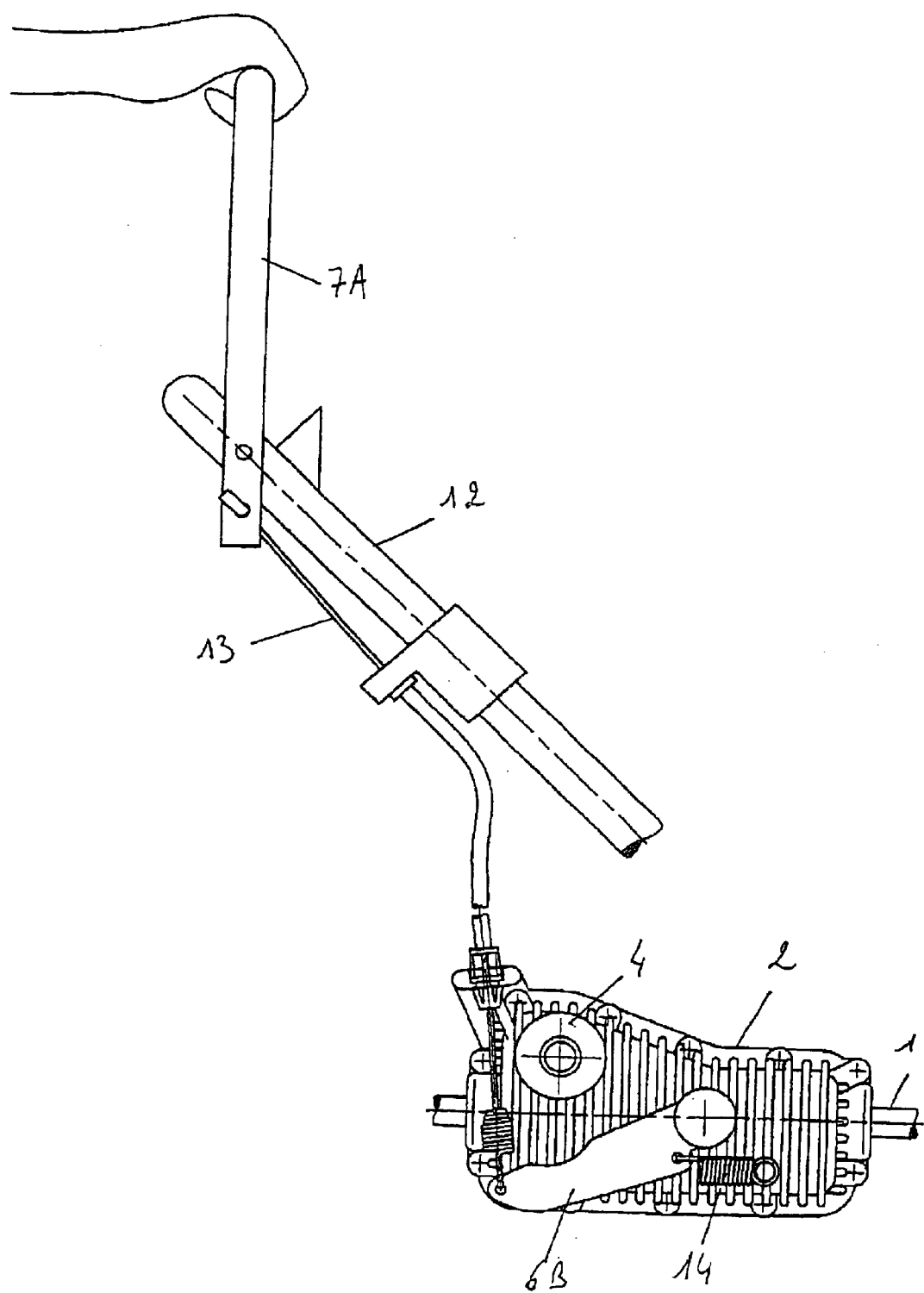
FIG. 3 is a view similar to FIGS. 1 and 2, in a disengaged position of the friction clutch.

Generally speaking, this control device is constituted by a first control member 6A, 6B movable angularly at least within the transmission housing 2 to ensure the gripping or the release of the driving element 3 and the driven element 5A, 5B, this first member 6A, 6B being connected by a movement transmission to a second member 7A positioned immediately adjacent or on the engine drive member 12, this second member 7A receiving the inertial force of the driver of the engine or of the engine itself. In the example illustrated in FIGS. 1 to 3, the second member is constituted by a lever 7A pivotally connected to said first member 6A, 6B by means of a transmission member, such as a cable 13. This second member can again be constituted by a handle sliding along the chassis of the engine.

Figure 4:
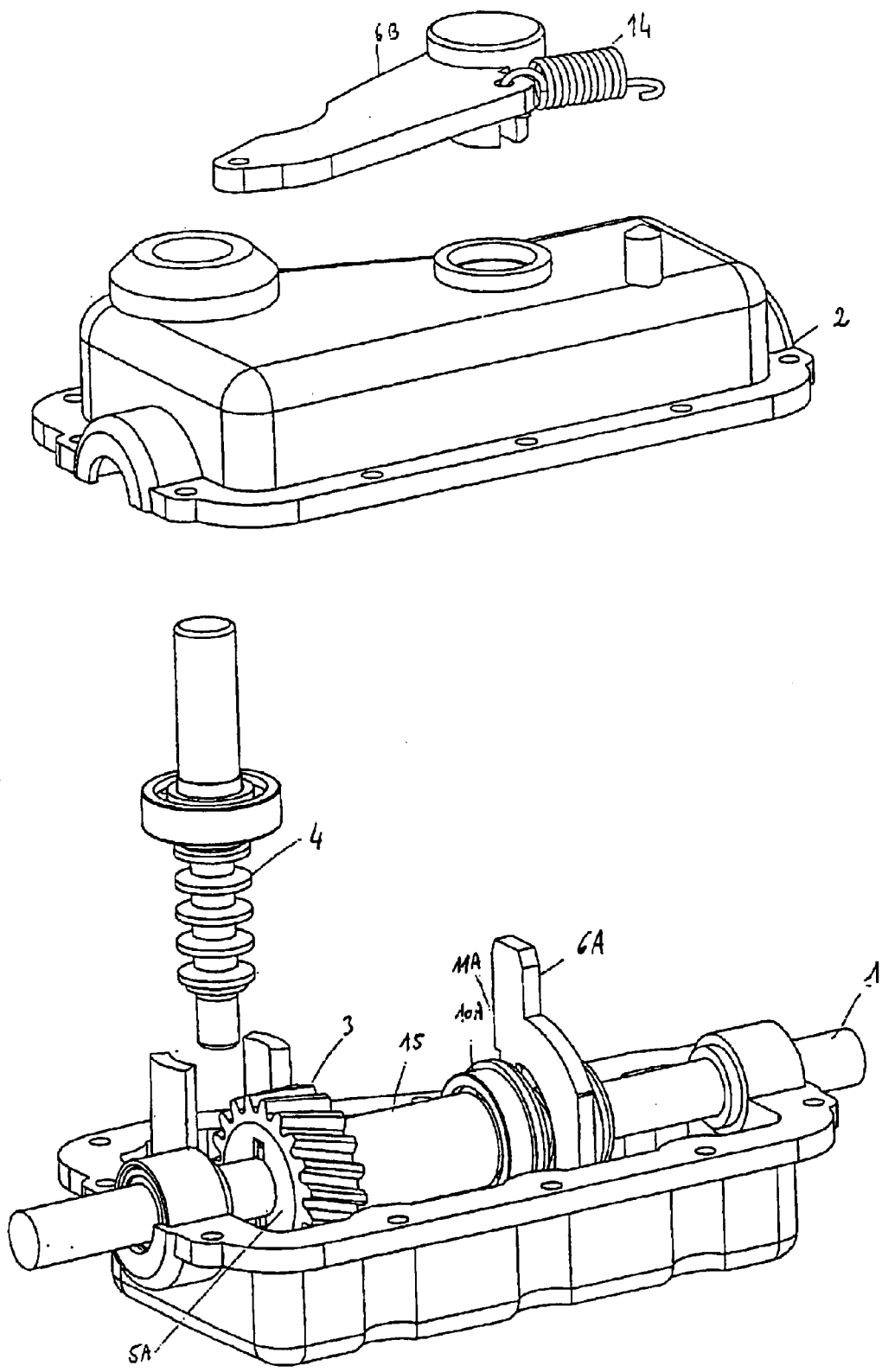
FIG. 4 is a fragmentary perspective view of a transmission housing according to the invention in an at least partially exploded position of the constituent elements.
Figure 5:
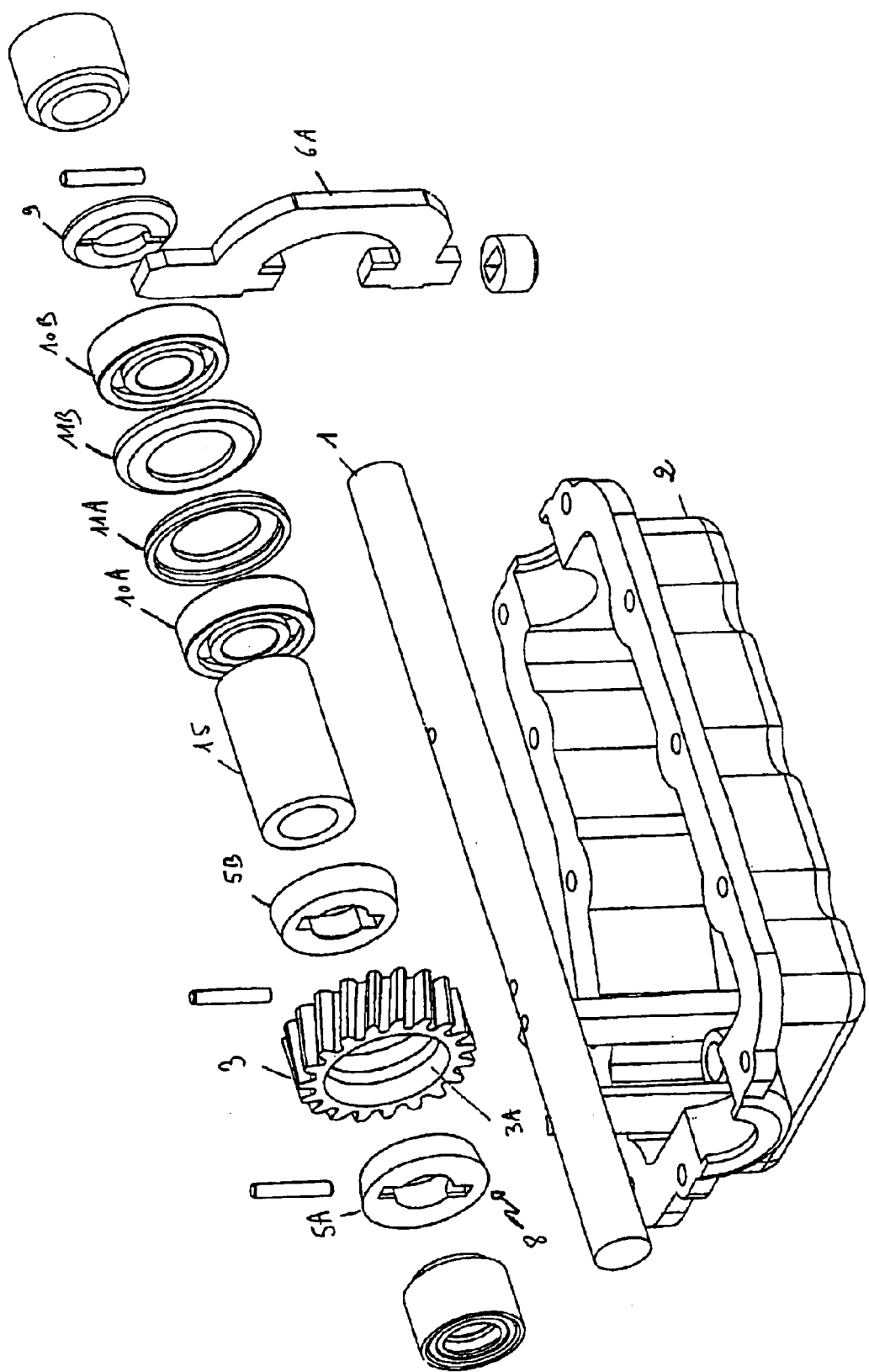
FIG. 5 is a fragmentary perspective view of a transmission in an exploded position of its constituent elements.
Figure 6:
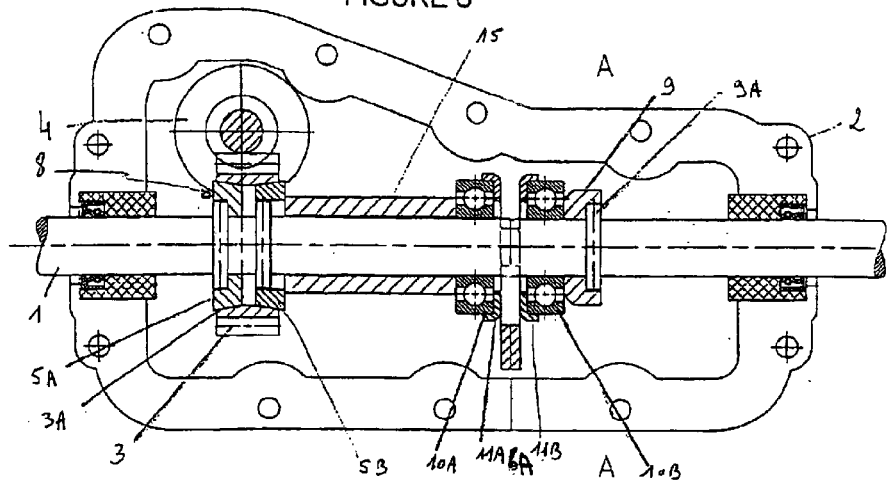
FIGS. 6 to 8 show cross-sectional views of a transmission in variable positions of clutching, FIG. 6 corresponding to an unclutched position, FIG. 8 corresponding to a fully engaged position.
Figure 7:
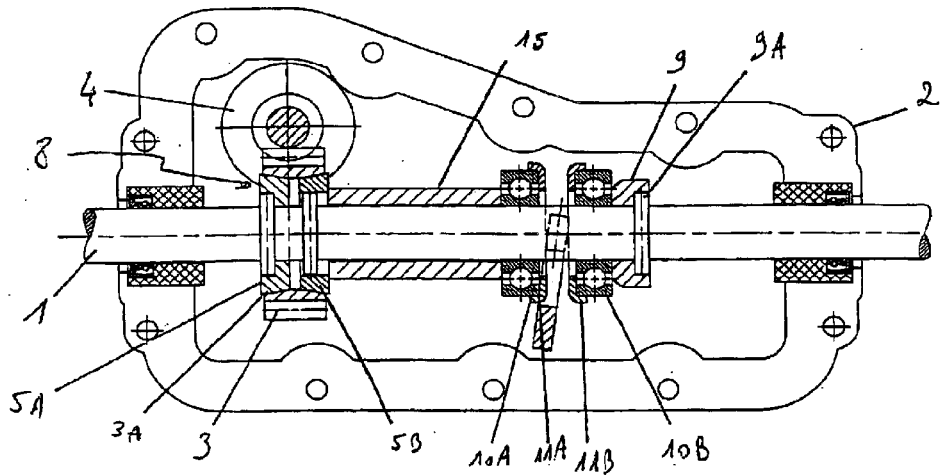
Figure 8:
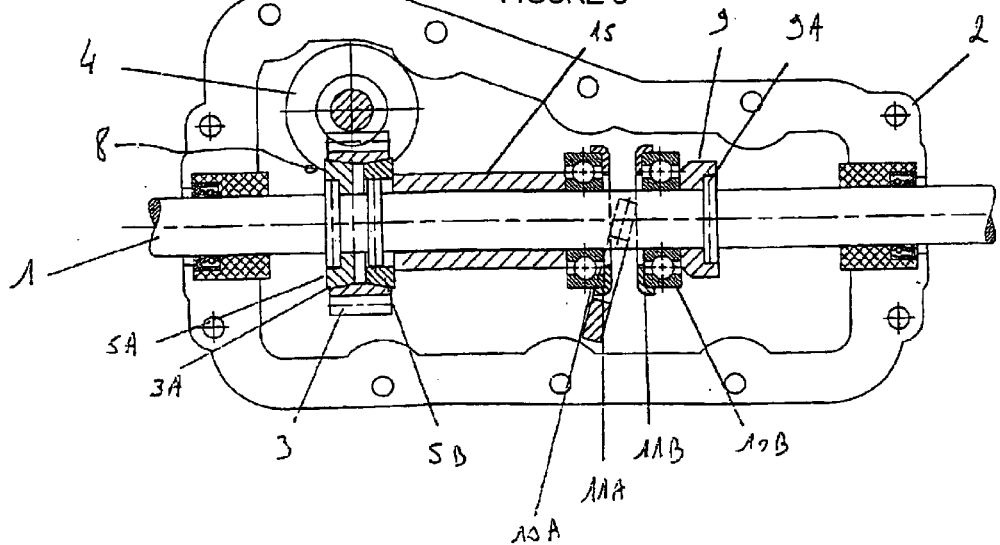

As shown in FIGS. 4 to 6, this first control member 6A, 6B has the form of an elbowed lever of which one arm constitutes a fork 6A movable angularly within the housing 2 by means of the other arm 6B outside the housing, this other arm, spring loaded in the direction of uncoupling of the driving and driven element, being subjected to the action of a second member 7A of the control device.

Because the friction clutching is also used as a speed changer, there is a very rapid heating of the interior of the housing. To avoid undesirable consequences of this heating, there is provided, on the shaft clutch and on the drive output shaft 1 carrying the driving element 3 or at least one driven element 5B mounted freely slidably on the shaft 1, stop means 8, 9 disposed on said shaft 1 on opposite sides of the driven rotatable element or elements to constitute axial abutments defining an interval of a maximum fixed length adapted to absorb the forces applied by means of the control device on the driven element and on the driven element of the clutch in the clutching phase and thus to shield the housing 2 carrying the output drive shaft from any force thanks to a field of application of the forces in a closed circuit.

In the illustrated examples, at least one means 9 of the stop means 8, 9 is constituted by a ring mounted fixedly in translation on the shaft by means of a connection member such as a pin 9A, the other stop means being constituted by a cone 5A mounted fixedly in translation and kinematically secured in rotation to the output drive shaft 1. This cone 5A is adapted to be disposed within an axial bore of the driving element 3 having the shape of a toothed wheel tangent to the controlled path of movement of the driven element 5B axially movable on the shaft 1 to come into engagement with a conical periphery 3A of the tangent wheel 3.

The first control member of the control device constituted by the fork-lever assembly is thus disposed between said stop means 8, 9 and thus constitutes a spacer disposed in the interval defined by said stop means 8, 9 as shown in FIGS. 4 to 6. This spacer is disposed between the axially free driven element 5B and the stop means 9 constituted by the ring. In this interval between the axially free driven element 5B and the stop means 9, in addition to the spacer, there are rolling members 10A, 10B, flanges 11A, 11B and crosspiece 15. Thus, there is provided on either side of the spacer, a rolling member 10A, 10B whose active surface adapted to come into contact with the spacer is covered by a hollowed flange 11A, 11B. There is also provided, between the axially movable driven element 5B and one of the rollers 10A, a crosspiece 15. The use of stop means 8, 9, disposed on opposite sides of the rotatable driven element 5B mounted freely axially on the shaft such that one of the stop means, in particular the stop means 8, will be constituted by one of the cones 5A of the friction clutching device, permits obtaining a low cost assembly. Moreover, thanks to this technical arrangement, the lateral walls of the housing are absolutely not stressed during engagement or disengagement of the cones.

The operation of such a transmission is particularly easy. When the driver walks behind the engine and acts on the member 7A of the control device, he can, as desired, by means of the cable 13 acting on the control member 6A, 6B, effect gripping or ungripping, which is to say approach or spacing apart of the cones relative to the conical peripheries 3A of the tangent wheel 3. When the terrain over which the engine moves is sloped, the engine naturally tends, under the influence of its own weight, to advance more quickly than the driver if the driver maintains his pace. Because of this, there results a movement of the member 7A in a direction ensuring disengagement of the driven element 5A, 5B relative to the driving element 3 and accordingly a reduction of the couple transmitted, such that, naturally, the engine adapts to the pace of the driver whilst taking into consideration the variations of the terrain. Conversely, if the terrain on which the engine moves rises, the driver tends naturally to move the first member 7A of the control device to the right in FIG. 1 and to effect gripping of the driven element 5A, 5 within the driving element 3. As a result, there is an increase of the couple transmitted such that the driver can maintain his pace even though the engine is following a rising path. Such a transmission hence has the advantage of permitting the driver automatically to control the speed of movement of the engine by adapting it to variations of the terrain without this transmission generating any heating within the transmission housing.

What is claimed is:

1. Transmission between a drive member and a drive shaft (1) of an automotive tractor engine, the transmission comprising, in a housing (2), a friction clutch constituted by at least one rotatable driving element (3) and at least one driven element (5A, 5B) carried by the drive shaft (1) and kinematically connected in rotation to the drive shaft, this driving element (3) and driven element (5A, 5B) coming into bearing contact with variable gripping to obtain a variation of the couple transmitted to the drive shaft (1) under the action of a control device that at least partially projects from the housing (2), wherein there is provided, on the drive shaft (1) at least one driven element (5B) freely slidably mounted on the drive shaft (1), stop means (8, 9) disposed on said drive shaft (1) on opposite sides of the rotatable driven element to constitute axial abutments defining an interval of a maximum fixed length adapted to contain the forces applied by means of the control device to the driven element of the clutch in a clutching phase and thereby to shield the housing (2) that carries the output drive shaft from any force thanks to a field of application of forces in a closed circuit.

2. Transmission according to claim 1, wherein the control device is constituted by a first member (6A, 6B) angularly displaceable at least within the interior of the transmission housing (2) to ensure the gripping or ungripping of the drive element (3) and the driven element (5A, 5B), this first member (6A, 6B) being connected by a movement transmission to a second member (7A) located immediately adjacent or on the drive member (12) of the engine, this second member (7A) receiving the inertial force of the driver of the engine or of the engine itself.

3. Transmission according to claim 2, said first member (6A, 6B) comprising at least one spacer disposed in an interval defined by said stop means (8, 9) between the driven element (5B) and a said stop means (9).

4. Transmission according to claim 3, which is further provided, on opposite sides of the spacer, with a rolling member (10A, 10B) whose active surface is adapted to come into contact with the spacer and is covered by a hollowed flange (11A, 11B).

5. Transmission according to claim 4, which is further provided, between the driven element (5B) and one of the rolling members (10A), with a cross member (15).

6. Transmission according to claim 2, wherein the first member (6A, 6B) has the shape of an elbowed lever of which one arm constitutes a fork (6A) angularly movable within the interior of the housing (2) by means of the other arm (6B) outside the housing, this other arm, loaded by a spring in the direction of ungripping of the driving and driven elements, being subjected to the action of a second member (7A) of the control device.

7. Transmission according to claim 1, wherein at least one (9) of the stop means (8, 9) is constituted by a ring fixedly mounted in translation on the shaft by means of a connection member (9A), the other stop means being constituted by a cone (5A) mounted fixedly in translation and kinematically secured in rotation to the drive shaft (1), this cone (5A) being disposed within an axial bore of the driving element (3) having the shape of a toothed wheel tangent to the path of movement controlled by the driven element (5B) axially movable on the shaft (1) to come into engagement with the conical periphery (3A) of the tangent wheel (3).

8. Transmission according to claim 1, wherein the driving element (3) of the transmission is constituted by a wheel in peripheral engagement with an endless drive screw (4), the wheel being adapted to be secured as desired to the drive shaft (1) by means of at least one driven element (5) having the shape of a cone mounted freely slidably and kinematically secured in rotation with the drive shaft (1), said cone (5B) being disposed within an axial bore of the tangent wheel to come, in the course of its controlled movement, into engagement with a conical periphery (3A) of the tangent wheel.

9. Tractor driving engine incorporating, between a drive member and a drive shaft, a transmission comprising, in a housing (2), a friction clutch constituted by at least one rotatable driving element (3) and at least one driven element (5A, 5B) carried by the drive shaft (1) and kinematically connected in rotation to the drive shaft, this driving element (3) and driven element (5A, 5B) coming into bearing contact with variable gripping to obtain a variation of the couple transmitted to the drive shaft (1) under the action of a control device that at least partially projects from the housing (2), wherein there is provided, on the drive shaft (1) at least one driven element (5B) freely slidably mounted on the drive shaft (1), stop means (8, 9) disposed on said drive shaft (1) on opposite sides of the rotatable driven element to constitute axial abutments defining an interval of a maximum fixed length adapted to contain the forces applied by means of the control device to the driven element of the clutch in a clutching phase and thereby to shield the housing (2) that carries the output drive shaft from any force thanks to a field of application of forces in a closed circuit.

* * * * *